United States Patent

Inoue et al.

[11] Patent Number: 5,605,057
[45] Date of Patent: Feb. 25, 1997

[54] ABSORPTION REFRIGERATING MACHINE

[75] Inventors: Naoyuki Inoue; Teiichi Mochizuki, both of Kanagawa-ken, Japan

[73] Assignee: Ebara Corporation

[21] Appl. No.: 561,285

[22] Filed: Nov. 21, 1995

[30] Foreign Application Priority Data

Dec. 1, 1994 [JP] Japan .................................. 6-321198

[51] Int. Cl.$^6$ .................................................. F25B 15/00
[52] U.S. Cl. .......................................................... 62/476
[58] Field of Search .............................. 62/101, 476, 298

[56] References Cited

U.S. PATENT DOCUMENTS

| | | | |
|---|---|---|---|
| 4,078,399 | 3/1978 | Sugimoto et al. | 62/476 |
| 4,493,192 | 1/1985 | Hibino et al. | 62/141 |
| 4,912,934 | 4/1990 | Itoh et al. | 62/112 |
| 5,016,445 | 5/1991 | Wehr | 62/101 |
| 5,016,448 | 5/1991 | Plzak | 62/476 |

FOREIGN PATENT DOCUMENTS 61-153353  7/1986  Japan .

Primary Examiner—William Doerrler
Attorney, Agent, or Firm—Armstrong, Westerman, Hattori, McLeland & Naughton

[57] ABSTRACT

The present invention provides a single effect or double effect absorption refrigerating machine comprising an absorber, an evaporator, a generator, a condenser, a heat exchanger, a solution pump and a refrigerant pump and wherein the absorber (A), evaporator (E), generator (G) and condenser (C) are disposed within a single housing in such a manner that the absorber (A) is disposed at a lower portion of the housing, the evaporator (E) is disposed aside and above the absorber (A), the condenser (C) is disposed above the absorber (A), and the generator (G) is disposed above the condenser (C), and further wherein a refrigerant gas passage (2) extending from the evaporator (E) to the absorber (A) and a refrigerant gas passage (1) extending from the generator (G) to the condenser (C) are provided between the evaporator (E) and the generator (G).

4 Claims, 3 Drawing Sheets

ABSORPTION REFRIGERATING MACHINE

BACKGROUND OF THE INVENTION

1. Field of the Invention

The present invention relates to an absorption refrigerating machine, and more particularly, it relates to an absorption refrigerating machine in which an absorber, an evaporator, a generator and a condenser are contained within a single housing.

2. Prior Art

In the past, regarding the installation of an absorber, an evaporator, a generator and a condenser of an absorption refrigerating machine, it is known to provide a so-called twin-housing in which the absorber and the evaporator are disposed within a housing portion (low temperature housing) and the generator and the condenser are disposed within another housing portion (high temperature housing). In this twin-housing, since the low temperature side and the high temperature side are independently constituted by the low and high temperature housing portions, respectively, there is substantially no problem regarding thermal stress. However, the dimensions of the machine are increased due to the presence of the twin-housing, and the material from which the housing is formed is also increased.

In order to reduce the amount of material and the cost of the machine, as shown in FIG. 3, there has been proposed a technique in which an absorber, an evaporator, a generator and a condenser are disposed within a single housing. However, in this conventional technique, a diameter (widthwise dimension) of the housing is increased, and, thus, a large installation space is required.

Further, in order to reduce the widthwise dimension and to make the apparatus compact, as shown in FIG. 4, there has been proposed a technique in which an absorber, an evaporator, a generator and a condenser are disposed within a prismatic housing. However, in this conventional technique, since both a high temperature portion and a low temperature portion are contained within a small space, there arises a problem regarding thermal stress.

SUMMARY OF THE INVENTION (Problem which the Invention is to Solve)

An object of the present invention is to provide an absorption refrigerating machine which can eliminate the above-mentioned conventional drawbacks and which can be made compact while suppressing thermal stress. (Means for Solving the Problem)

To solve the above-mentioned problem, according to the present invention, there is provided a single effect or double effect absorption refrigerating machine comprising an absorber, an evaporator, a generator, a condenser, a heat exchanger, a solution pump and a refrigerant pump and wherein the absorber, evaporator, generator and condenser are disposed within a single housing in such a manner that the absorber is disposed at a lower portion of the housing, the evaporator is disposed aside and above the absorber, the condenser is disposed above the absorber, and the generator is disposed above the condenser, and further wherein a refrigerant gas passage extending from the evaporator to the absorber and a refrigerant gas passage extending from the generator to the condenser are provided between the evaporator and the generator.

(Operation of the Invention)

In the absorption refrigerating machine, a highest temperature is generated at the generator portion (a heat transfer portion of the generator, and the solution) within the housing. A second higher temperature portion is the condenser portion, a third high temperature portion is the absorber portion, and a lowest temperature portion is the evaporator portion.

According to the present invention, since the absorber is disposed at the lower portion of the housing, the evaporator is disposed aside and above the absorber, the condenser is disposed above the absorber, the generator is disposed above the condenser, and since the gas passage between the highest temperature generator and the lowest temperature evaporator is divided into the gas passage extending from the generator to the condenser and the gas passage extending from the evaporator to the absorber to obtain gradually decreasing temperature distribution, it is possible to considerably reduce the thermal stress in comparison with the conventional refrigerating machines in which various elements are contained within a single housing.

DETAILED DESCRIPTION OF THE PREFERRED EMBODIMENTS

Figure 1:
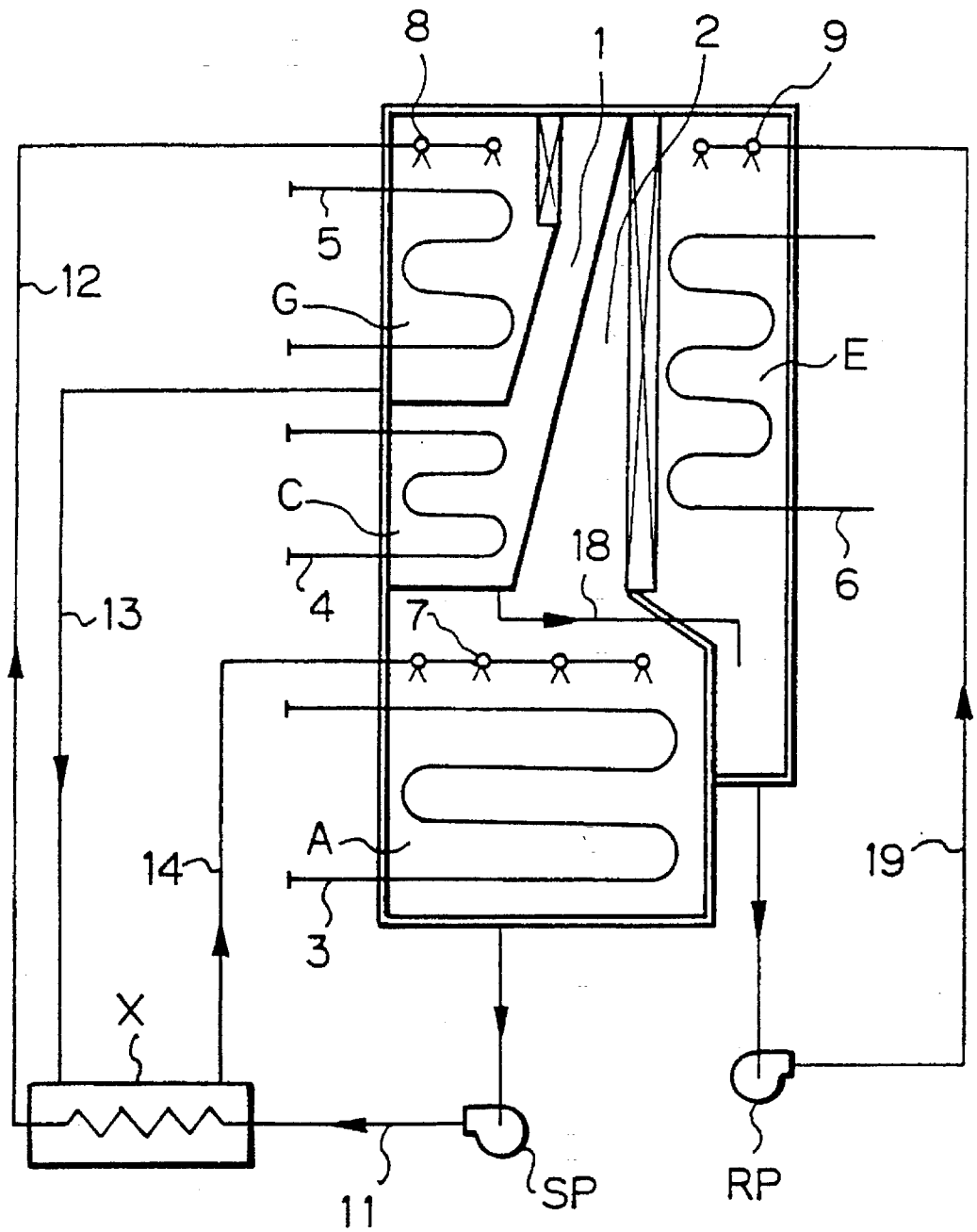
FIG. 1 is a schematic elevational sectional view of an absorption refrigerating machine according to a first embodiment of the present invention.

The present invention will now be explained more specifically in connection with embodiments thereof with reference to the accompanying drawings. In the drawings, the same reference numerals or marks denote the same or corresponding members. It should be noted that the present invention is not necessarily limited to these embodiments.

FIG. 1 is a schematic elevational sectional view of an absorption refrigerating machine according to a first embodiment of the present invention. In FIG. 1, the absorption refrigerating machine is constituted by an absorber A, an evaporator E, a generator G, a condenser C, refrigerant gas passages 1, 2, cooling water sources 3, 4, a heat medium source 5, a cold water passage 6, a concentrated solution spray tube 7, a diluted solution spray tube 8 and a refrigerant liquid spray tube 9.

According to the present invention, the absorber A, evaporator E, generator G and condenser C are contained within a single prismatic housing in such a manner that the absorber A is disposed at a lower portion of the housing, the evaporator E is disposed aside and above the absorber A, the condenser C is disposed above the absorber A, and the generator G is disposed above the condenser C. Further, a low pressure side including the absorber A and the evaporator E is isolated from a high pressure side including the generator G and the condenser C by means of an oblique partition, and the passage 1 through which the refrigerant gas flows from the generator G to the condenser C is disposed above the oblique partition and the passage 2 through which the refrigerant gas flows from the evaporator E to the absorber A is disposed below the oblique partition.

The absorber A is connected to the generator G via pipings 11, 12 passing through a solution pump SP (through which the diluted solution flows) and a heated side of a heat exchanger X and pipings 13, 14 passing through a heating side of the heat exchanger X (through which the concentrated solution flows). Further, the condenser C is connected to the evaporator E via a piping 18, and the evaporator E is connected to a piping 19 passing through a refrigerant pump RP.

In an operation of the above-mentioned absorption refrigerating machine, the refrigerant gas is absorbed into the concentrated solution (7) in the absorber A, and the diluted solution into which the refrigerant is absorbed is passed through the piping 11, the heated side of the heat exchanger X and the piping 12 by means of the solution pump SP to reach the generator G, where the diluted solution is heated by the heat source 5. In this way, the diluted solution is concentrated by generating the refrigerant therefrom. The concentrated solution is circulated into the absorber A through the piping 13, the heating side of the heat exchanger X and the piping 14. On the other hand, the refrigerant gas generated in the generator G is sent, through the passage 1, to the condenser C, where the gas is cooled by the cooling water (4) to form the refrigerant liquid which is in turn introduced into the evaporator E through the piping 18.

In the evaporator E, the refrigerant liquid is circulated through the piping 19 and the refrigerant spray tube 9 by means of the refrigerant pump RP to be evaporated; meanwhile, heat of vaporization is removed from the cold water (6) to further cool the cold water, which is used into the cooling operation. The evaporated refrigerant gas is introduced into the absorber A through the passage 2 and is then absorbed by the concentrated solution (7).

In this way, according to the present invention, the high temperature generator G is isolated from the low temperature evaporator E by means of the refrigerant passages 1, 2, thereby making use of the difference in temperature between the elements.

Figure 2:
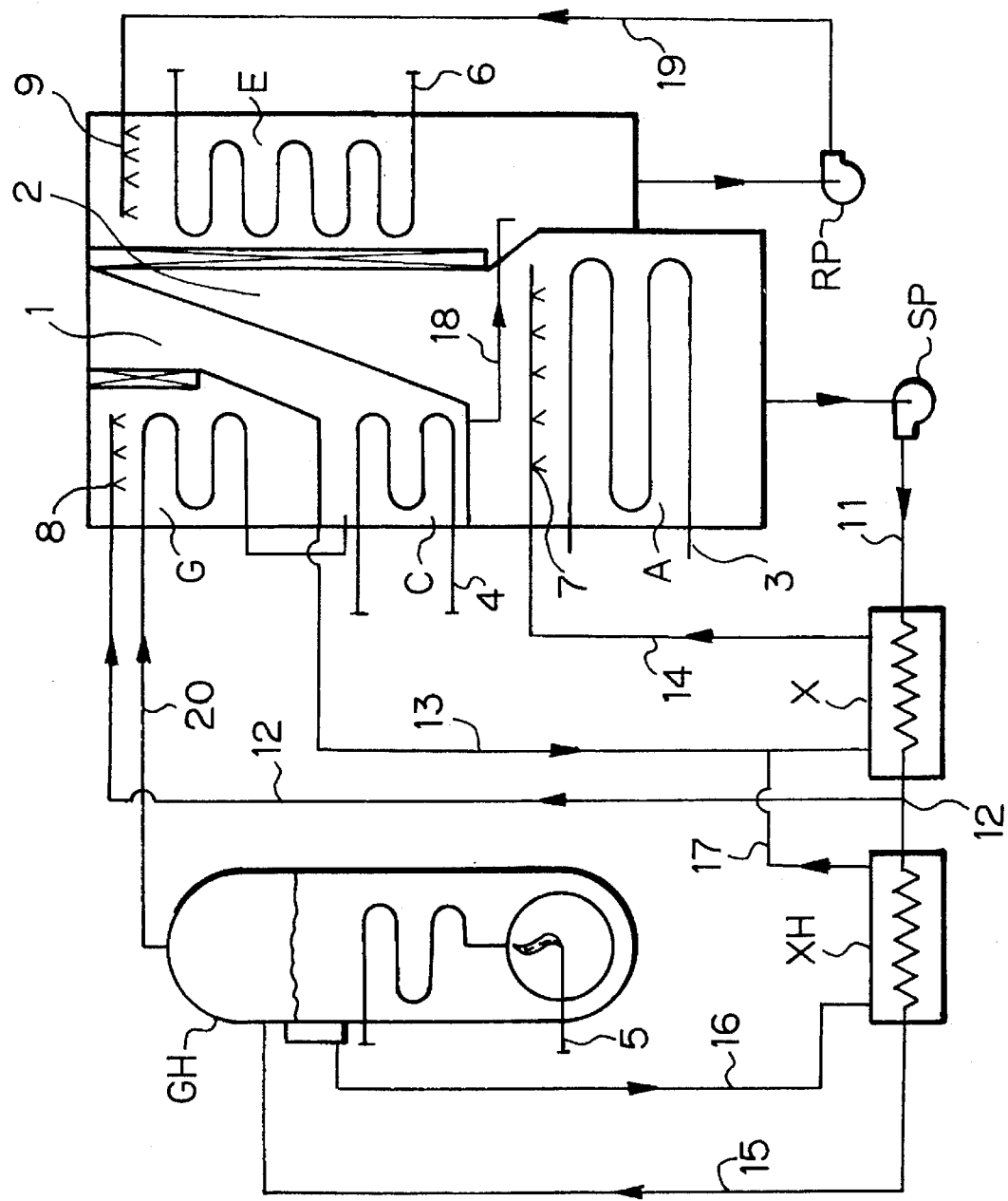
FIG. 2 is a schematic elevational sectional view of a double effect absorption refrigerating machine according to a second embodiment of the present invention.
Figure 3:
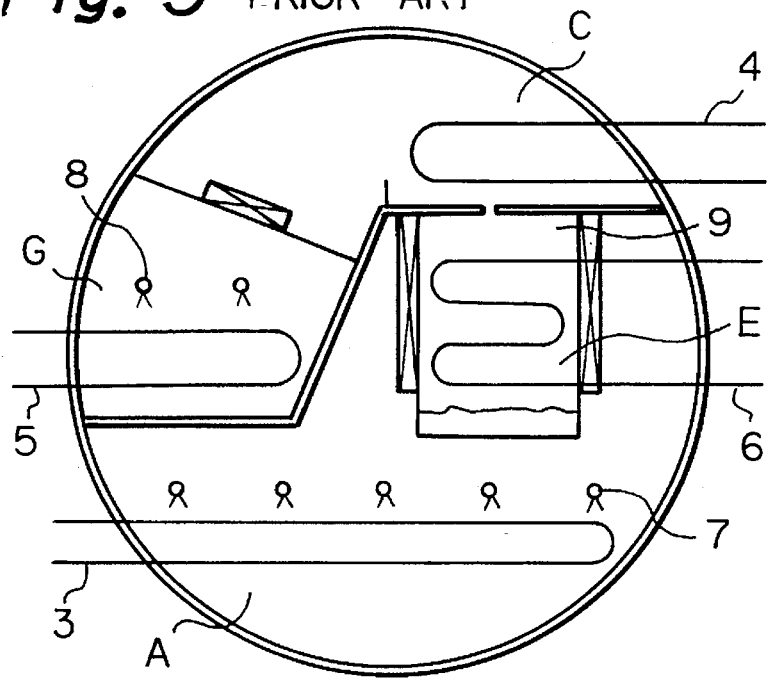
FIG. 3 is a schematic elevational sectional view showing an example of a conventional absorption refrigerating machine.
Figure 4:
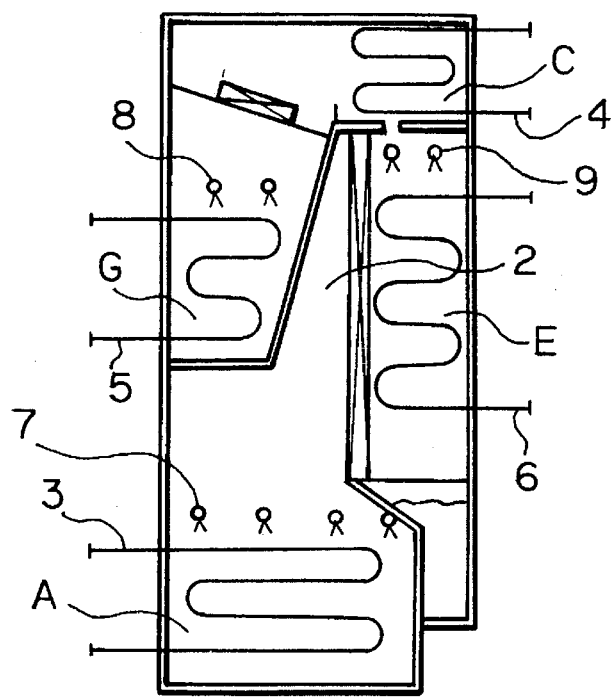
FIG. 4 is a schematic elevational sectional view showing another example of a conventional absorption refrigerating machine.

FIG. 2 is a schematic elevational sectional view of a double effect absorption refrigerating machine according to a second embodiment of the present invention. In FIG. 2, the arrangement in which the absorber A, evaporator E, generator G and condenser C are contained within the housing is the same as that shown in FIG. 1. However, in the embodiment shown in FIG. 2, there is provided a high temperature generator GH connected to the housing.

With this arrangement, the diluted solution from the absorber A is passed through the heat exchanger X. A part of the solution is branched from the piping 12. The solution flowing through the piping 12 is introduced into the generator G, as is in the first embodiment shown in FIG. 1. The remaining portion of the diluted solution is passed through a heated side of a high temperature heat exchanger XH and a piping 15 and is introduced into the high temperature generator GH, where the solution is heated by the heat source 5 to the concentrated solution. The heated and concentrated solution is passed through the piping 16, the heating side of a high temperature heat exchanger XH and a piping 17 to reach the concentrated solution piping 13 from the generator G.

Further, the refrigerant gas generated in the high temperature generator GH is sent, through a piping 20, to the generator G, where the refrigerant gas is used as a heat source for the generator. Then, the refrigerant gas is condensed and introduced into the condenser C.

The paths and operations for the other solutions and refrigerants are the same as those shown in FIG. 1. (Effect of the Invention)

As mentioned above, according to the present invention, the absorber, evaporator, generator and condenser of the absorption refrigerating machine can effectively be contained within the single housing in a compact fashion, and the thermal stress can be suppressed effectively.

What is claimed is:

1. An absorption refrigerating machine wherein refrigerant gas separated from solution in a generator (G) is cooled by a condenser (C) to form refrigerant solution, the refrigerant solution is vaporized in an evaporator (E) to cool a cooling load (6) in said evaporator, the solution from said generator is introduced into an absorber (A) through a heat exchanger (X), and the refrigerant gas generated in said evaporator is absorbed to the solution in said absorber, said machine comprising:

a single housing containing said absorber (A), said evaporator (E), said generator (G) and said condenser (C), said absorber (A) occupying a lowermost portion of said housing, said condenser (C) being superposed on said absorber (A) on one transverse side of said housing and said generator (G) being superposed upon said condenser (C) in said one transverse side of said housing, and said evaporator (E) being disposed above said absorber (A) on the other transverse side of said housing.

2. An absorption refrigerating machine according to claim 1, wherein said housing has a substantially rectangular cross-section in a vertical direction, and includes a space provided transversely intermediate said condenser (C) and said evaporator (E), said space being divided into a refrigerant gas passage (2) extending from said evaporator to said absorber and a refrigerant gas passage (1) extending from said generator to said condenser.

3. An absorption refrigerating machine according to claim 1, further comprising a high temperature generator (GH) and a high temperature heat exchanger (XH), and wherein the refrigerant gas generated in said high temperature generator (GH) is used as a heat source for a low temperature generator (GL), the concentrated solution from said high temperature generator (GH) is introduced into said absorber (A) through said high temperature heat exchanger (XH), the concentrated solution from said generator is introduced into said absorber (A) through said heat exchanger (X), the diluted solution from said absorber is passed through said heat exchanger (X) and a part of the diluted solution is introduced into said generator (G), and remaining amount of the diluted solution from said absorber is further passed said high temperature heat exchanger and introduced into said high temperature generator, thereby providing a double effect absorption refrigerating machine.

4. An absorption refrigerating machine according to claim 3, wherein said high temperature generator (GH) and said high temperature heat exchanger (XH) are disposed out of said housing.

\* \* \* \* \*

UNITED STATES PATENT AND TRADEMARK OFFICE
CERTIFICATE OF CORRECTION

PATENT NO.: 5,605,057
DATED: February 25, 1997
INVENTOR(S): Inoue et al.

It is certified that error appears in the above-identified patent and that said Letters Patent is hereby corrected as shown below:

On the cover page, Item [73], please list the assignee's city to show as follows: 11-1, Haneda Ashai-cho, Ohta-ku, Tokyo, JAPAN.

Signed and Sealed this

Twenty-eighth Day of October, 1997

*Attest:*

BRUCE LEHMAN

*Attesting Officer*  *Commissioner of Patents and Trademarks*